Sept. 12, 1939.  O. R. MITCHELL  2,172,565
BRAKE SHOE KEY RETAINER
Filed Nov. 8, 1937
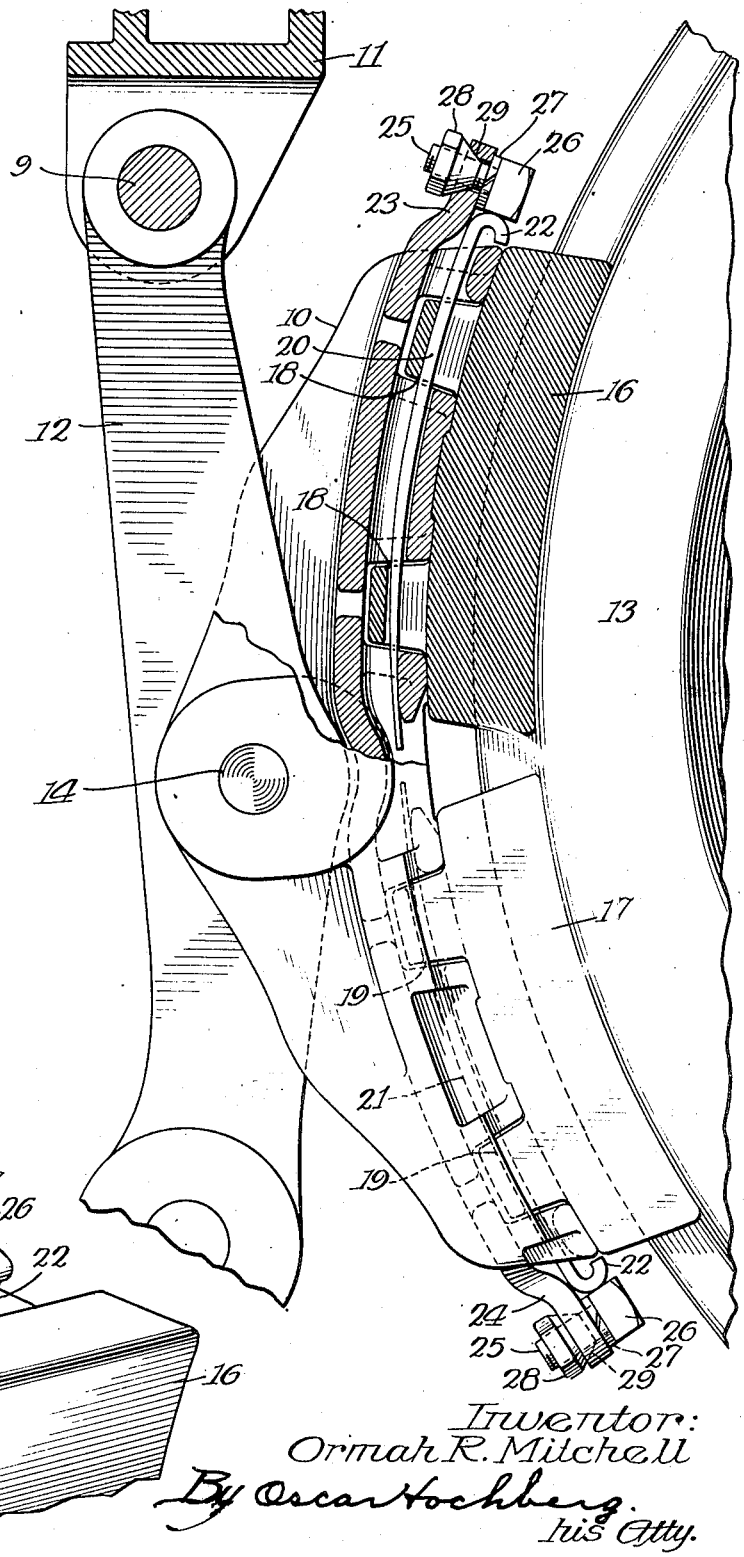
Inventor:
Orma R. Mitchell
By Oscar Hochberg
his Atty.

Patented Sept. 12, 1939

2,172,565

UNITED STATES PATENT OFFICE 2,172,565

BRAKE SHOE KEY RETAINER

Ormah R. Mitchell, Chicago, Ill., assignor to Pullman-Standard Car Manufacturing Company, Chicago, Ill., a corporation of Delaware Application November 8, 1937, Serial No. 173,322

17 Claims. (Cl. 188—240)

This invention relates to railway car brakes with particular reference to the connection between brake head and brake shoes.

The principal object of the invention is the provision of removable abutment means for retaining a brake shoe key between a brake head and brake shoe.

Another object of the invention is the provision of a brake head accommodating two brake shoes with separate keys for each inserted between the respective shoes and head in opposing relation and having removable abutment means on the head for retaining each key.

The specific object of the invention is the provision of a brake head having a brake shoe removably attached thereto by a key and having a bolt acting as an abutment to retain the key properly in position.

The foregoing and other objects are attained by the mechanism illustrated in the accompanying drawing, in which Fig. 1 is a general view of a brake head embodying the principle of this invention, suspended from a truck frame in position to engage the car wheel, and Fig. 2 is a fragmentary, perspective view of one end of a brake head and shoe and showing the brake shoe key retaining means in detail.

In the drawing, the brake head 10 is supported in the plane of the car wheel 13 from the truck frame 11 by a brake hanger 12 pivotally connected to the frame at 9. The head 10 is pivotally connected to the hanger 12 intermediate the ends thereof, as at 14, and the lower end of the hanger is connected to a brake beam (not shown) for applying the brakes. The head 10, as shown, is of the type accommodating two brake shoes 16 and 17, although the invention is equally applicable to a brake head having but a single shoe. The shoes 16 and 17 each interlock with the head 10 as at 18 and 19, and keys 20 and 21, penetrating the interfitting parts of the respective shoes and head, secure their interlocking relation as in usual practice. The keys 20 and 21 are inserted into the assembly in opposing relation—the key 20 from the top, as in a single shoe type of brake head, and the key 21 from an inverted position from the bottom. The keys 20 and 21 are each provided with a rebent head portion 22 for a purpose hereinafter referred to.

The brake head 10 is provided with extension ears 23 and 24, top and bottom, each perforated to accommodate a bolt 25. The bolts 25 are disposed with their heads 26 toward the wheel or shoe side of the brake head, and lockwashers 27, underlying the heads of the bolts, prevent reverse rotation thereof; and tapered nuts 28 secure the bolts in place against the action of the spring lockwashers. The tapered nuts 28, seating in the conical bearings 29 in the extensions 23 and 24, are self-locking, and the frictional engagement afforded by the conical bearing will prevent reverse rotation thereof. The extensions 23 and 24 and the bolts 25 are so disposed that the heads 26 of the bolts overlie the keyways for keys 20 and 21 so that a positive abutment is provided preventing accidental escape of the keys. The lockwashers 27 have the further function of serving to cause the bolt heads 26 further to overlie the keyways positively to prevent any possibility of the keys escaping past the bolt heads. The heads 26 of the bolts are square and disposed in close engagement with the heads of the brake shoe keys, which, as will be seen from Fig. 2, are of substantial width so that when it is desired to remove the bolts 25 to permit withdrawal of the keys 20 and 21, rotation of the bolts, as the tapered nuts 28 are loosened, will be prevented by virtue of such engagement between the bolt heads and the brake shoe keys, and the rebent portions of the brake shoe keys will facilitate this action by engagement with the ends of the brake heads to act as a positive lock between the bolt heads and brake head and thereby prevent turning of the bolt head. The rebent heads 22 also facilitate removal of the keys by providing secure purchase for a tool inserted for this purpose.

It will be seen that the bolts 25 positively prevent withdrawal of the brake shoe keys until after the bolts themselves have been removed and without penetration of the key or direct connection in any manner, but by merely blocking the normal path of movement of the keys. While the effectiveness of the device with respect to the lower inverted key will readily be appreciated, it is equally effective in preventing the creeping action which heretofore has frequently resulted in actual loss of keys inserted from the top of the brake head. While the extensions for the accommodation of the removable bolts appreciably lengthen the brake head, it is readily apparent, from an examination of Fig. 1, that ample clearance is provided between the brake head and truck frame as the brakes move to their released position.

What is claimed is:

1. The combination comprising a brake head having a brake shoe secured thereto by a key, and removable abutment means for retaining the key properly in place comprising a member having threads and secured by such threads.

2. The combination comprising a brake head having a brake shoe secured thereto by a key, and removable abutment means on the brake head for retaining the key properly in place comprising a member having threads and secured by such threads.

3. The combination comprising a brake head, a brake shoe secured to the brake head by a key, an extension on the head, and a removable bolt secured to said extension in abutting relation to said key adapted to prevent withdrawal of the key.

4. The combination comprising a brake head, a brake shoe secured to the brake head by a key, an extension on the brake head, a removable bolt penetrating the extension and preventing withdrawal of said key, and means securing the bolt to the extension comprising a self-locking tapered nut.

5. The combination comprising a brake head, a brake shoe secured to the brake head by a key, an extension on the brake head, a removable bolt having a head and penetrating the extension adapted to prevent withdrawal of said key, and means securing the bolt to the extension comprising a lockwasher under the head of the bolt on one side of the extension and a self-locking tapered nut engaging a conical bearing on the opposite side of the extension.

6. The combination comprising a brake head, a plurality of brake shoes secured to the brake head by separate keys, and removable means on the head independent of the keys and preventing withdrawal thereof and disposed in abutting relation to the ends of the respective keys.

7. The combination comprising a brake head, two brake shoes mounted on the brake head, separate brake shoe keys securing the brake shoes individually to the brake head and inserted therein in opposite directions from the top and bottom respectively, and means on the brake head preventing withdrawal of said keys comprising individually removable bolt members in direct end-abutting relation to the respective brake shoe keys.

8. The combination comprising a brake head, two brake shoes mounted on the brake head, separate brake shoe keys individually securing the brake shoes to the brake head and inserted therein in opposing relation from the top and bottom respectively, extensions top and bottom on the brake head, and individually removable bolt members penetrating said extensions and providing fixed abutments directly in the path of movement of the respective brake shoe keys.

9. The combination comprising a brake head, two brake shoes mounted on the brake head, separate brake shoe keys individually securing the brake shoes to the brake head and inserted therein in opposing relation from the top and bottom respectively, extensions top and bottom on the brake head, and individually removable bolt members penetrating said extensions and preventing withdrawal of the respective brake shoe keys, said bolt members each having a head in abutting relation to the respective keys and secured to said extensions by a lockwasher under the respective heads on one side of the extensions and self-locking tapered nuts engaging conical seats on the opposite side of the respective extensions.

10. The combination comprising a brake head, a brake shoe secured to the brake head by a key, an extension on the brake head, and a removable bolt penetrating said extension having a head in abutting relation to said key adapted to prevent withdrawal of the key.

11. The combination comprising a brake head, a brake shoe secured to the brake head by a key, an extension on the brake head, a removable bolt penetrating the extension having a head in abutting relation to said key preventing withdrawal of the key, and means securing the bolt to the extension comprising a lockwasher under the bolt head on one side of said extension and a nut threaded on the bolt on the opposite side of the extension.

12. The combination comprising a brake head, a brake shoe secured to the brake head by a key, and a removable bolt secured to said brake head by a threaded nut and having a head in abutting relation to said key adapted to prevent withdrawal thereof.

13. The combination comprising a brake head, a brake shoe secured to the brake head by a removable key, and a bolt removably secured to said brake head in direct end-abutting relation to said key.

14. The combination comprising a brake head, two brake shoes mounted on the brake head, separate removable brake shoe keys individually securing the brake shoes to the brake head and inserted therein in opposing relation from the top and bottom respectively, and individually removable bolt members secured to the brake head in direct end-abutting relation to the respective brake shoe keys.

15. The combination comprising a brake head, two brake shoes mounted on the brake head, separate brake shoe keys securing the brake shoes to the brake head and inserted therein in opposing relation from the top and bottom respectively, and removable means on the brake head independent of the respective brake shoe keys disposed in end-abutting relation to said keys.

16. The combination comprising a brake head, a brake shoe secured to the head by a removable key, and removable means on the brake head independently of the key disposed in end-abutting relation to said key.

17. The combination comprising a brake head, a brake shoe secured to the brake head by a removable key, and a bolt removably secured to the brake head to prevent withdrawal of said key disposed in end-abutting relation to the key.

ORMAH R. MITCHELL.